United States Patent [19]

Tsymbal et al.

[11] Patent Number: 4,948,488
[45] Date of Patent: Aug. 14, 1990

[54] APPARATUS FOR THE ELECTROCHEMICAL MACHINING OF FASHIONED SURFACES

[76] Inventors: Valery D. Tsymbal, ulitsa Pushkinskaya, 16, kv. 3; Vladimir G. Chernyshev, prospekt Krasnogo Znameni, 118, kv. 149; Mikhail G. Zhuravlev, ulitsa Irtyshskaya, 20, kv. 3; Oleg K. Morozov, ulitsa Borisenko, 6, kv. 66, all of Valdivostok; Georgy A. Tulyakov, ulitsa Sharikopodshipnikovskaya, 2, kv. 46, Moscow; Alexandr V. Strutynsky, ulitsa Amurskaya, 22, kv. 3, Vladivostok, all of U.S.S.R.

[21] Appl. No.: 379,810

[22] Filed: Jul. 14, 1989

[51] Int. Cl.$^5$ .................. B23H 3/04; B23H 7/12; B23H 7/28
[52] U.S. Cl. .................. 204/212; 204/224 M; 204/225; 204/280
[58] Field of Search .................. 204/212, 222, 224 M, 204/225, 280

[56] References Cited

U.S. PATENT DOCUMENTS

| | | | |
|---|---|---|---|
| 3,565,775 | 2/1971 | Bouchet et al. | 204/224 M X |
| 3,624,336 | 11/1971 | Martinez | 204/212 X |
| 3,650,936 | 3/1972 | Towle | 204/224 M X |
| 4,100,388 | 7/1978 | Meyer | 204/129.1 X |
| 4,243,862 | 1/1981 | Wetzels | 204/212 X |
| 4,256,555 | 3/1981 | Wilson et al. | 204/224 M X |
| 4,608,477 | 8/1986 | Diechelbohrer | 204/212 X |

FOREIGN PATENT DOCUMENTS

| | | |
|---|---|---|
| 3419503 | 11/1985 | Fed. Rep. of Germany . |
| 2371997 | 6/1978 | France . |
| 260786 | 5/1970 | U.S.S.R. . |

OTHER PUBLICATIONS

"Industrial Robots in the Manufacture of Radioelectronic Equipment", by E. V. Myslovsky, 1988.

*Primary Examiner*—Donald R. Valentine
*Attorney, Agent, or Firm*—Fleit, Jacobson, Cohn, Price, Holman & Stern

[57] ABSTRACT

An apparatus for the electrochemical machining of fashioned surfaces has a bed held fast to a fashioned surface, a working unit in the form of a pair of electrodes mounted on a drive for rotating them on the side of the fashioned surface. The electrodes are made in the form of discs having their axes extending at an angle with respect to each other. The apparatus also has a system for feeding the working unit to the fashioned surface which has a carriage having a drive for moving the carriage horizontally along the bed, the carriage being mounted on the bed, a mechanism for imparting oscillatory motions to the working unit provided on the carriage, and a drive for vertically feeding the working unit mounted on the carriage. The working unit is mounted on a shaft of the drive for vertically feeding the working unit.

4 Claims, 3 Drawing Sheets

APPARATUS FOR THE ELECTROCHEMICAL MACHINING OF FASHIONED SURFACES

FIELD OF THE ART

The invention relates to the field of metal machining by acting with electric current upon a work using electrodes, and more specifically it deals with an apparatus for the electrochemcial machining of fashioned surfaces.

The invention may be used for testing mechanical properties, microstructure and radiation-induced embrittlement of metal in reactor casings. The invention may be as well used for detecting micropores and microcracks in metals in evaluating condition and expected life of units and parts of thermal and nuclear power plants, chemical, refinery and metallurgical units and may also be used in assessing condition of metals and alloys used in transportation equipment.

BACKGROUND OF THE INVENTION

Known in the art is an apparatus for the electrochemical cutting of narrow grooves (DE, C, 3419503), comprising a wire or rod electrode having an auxiliary member provided on the side of the working end thereof to extend along the entire working length of the electrode. Both the electrode and the auxiliary member are moved deep into a work being machined. A power supply is connected to the electrode, an electrolyte is supplied into a gap defined between the electrode and the work so that a groove is cut in this gap. The electrolyte flows through the gap, and the dissolved material of the work is removed from the groove together with the electrolyte. Therefore, the gap is always filled with the electrolyte during the groove cutting period, and the dissolved material is removed with the electrolyte from the gap. This apparatus cannot ensure groove cutting with a uniform size lengthwise of the groove which results in a low productivity of the apparats. This apparatus cannot be used for producing triangular section specimens from fashioned surfaces with a large radius of curvature.

Known in the art is an electrical discharge cutting apparatus (FR, B, 2371997), comprising an electrode in the form of a thin disc of a copper/tungsten alloy without insulation, a drive for rotating the electrode, and a system for feeding the electrode to a surface being machine, a means for supplying electric current to the electrode. Electrolyte supplied to the working end face of the electrode also functions as cutting fluid. The electrolyte in the form of concentrated sodium nitrate is supplied in a large quantity and under a low pressure to the rotating electrode moving in the cutting plane. This apparatus makes it possible to cut grooves of rectangular section with surfaces changes in the metal structure and does not allow a confident sample of triangular section for tests to be produced, i.e. a sample of a sufficient mass to carry out measurements of metal density and of a desired cross-sectional area for counting micropores, and the like.

Known in the art is an apparatus for the electrochemical machining of fashioned surfaces (SU, A, 260786), comprising a bed, a working unit coupled thereto and comprising a pair of electrodes mounted on a drive for their rotation on the side of a fashioned surface, each of the electrodes comprising a disc, the axes of the discs extending at an angle with respect to each other, a system for feeding the working unit to the fashioned surface having a drive for vertically feeding the working unit. The electrodes are rotated by means of a single electric motor. A workpiece is held fast to the bed, and the depth of a groove being cut is set up by the drive for vertically feeding the working unit. When an electrolyte supply system is turned on for electrolyte supply to the rotating electrodes and current is supplied to the electrodes from a power supply, the electrodes are caused to move along the workpiece thereby cutting the groove.

This apparatus does not allow a sample of triangular section to be obtained during operation of the two electrodes as their profiled portions intersect each other when penetrating at full depth of the workpiece so that they can only cut a groove and cannot cut out a triangular specimen. This apparatus has a low productivity since oscillations of the electrodes are not provided in machining a fashioned surface so that much time is spent for the electrodes to move deep into a preset depth in the surface of the workpiece.

SUMMARY OF THE INVENTION

It is an object of the invention to provide an apparatus for the electrochemical machining a fashioned surfaces which makes it possible to produce triangular-section specimens and which has an enhanced productivity.

The invention substantially resides in that an apparatus for the electrochemical machining of fashioned surfaces comprises a bed held fast to a fashioned surface, a working unit coupled to the bed. The working unit comprises a pair of electrodes. Each of the electrodes comprises a disc, the axes of the electrodes extending at an angle with respect to each other. The working unit also comprises a drive for rotating the electrodes, the electrodes being mounted on the drive on the side of the fashioned surface. The apparatus for the electrochemical machining of fashioned surfaces also comprises a system for feeding the working unit to the fashioned surface. The system for feeding the working unit to the fashioned surface comprises a carriage mounted on the bed, a drive for horizontally moving the carriage connected to the carriage, a drive for vertically feeding the working unit provided on the carriage, and a mechanism for imparting oscillatory motions to the working unit also provided on the carriage. The working unit is mounted on a shaft of the drive for vertically feeding the working unit. Novelty resides in that the system for feeding the working unit to the fashioned surface comprises a carriage having a drive for moving the carriage horizontally along the bed, the carriage being mounted on the bed. The bed is secured to the fashioned surface. The drive for vertically feeding the working unit is mounted on the carriage, and the working unit is mounted on a shaft of the drive for vertically feeding the working unit. Novelty also resides in that the system for feeding the working unit to the fashioned surface comprises a mechanism for imparting oscillations to the working unit provided on the carriage.

The provision in the system for feeding the working unit to the fashioned surface in an apparatus for the electrochemical machining of fashioned surfaces of a carriage having a drive for moving it horizontally along the bed and the provision in the system for feeding the working unit to the fashioned surface of a mechanism for imparting oscillatory motions to the working unit ensure oscillations of the electrodes about an axis running in parallel with the surface being machined, their movement deep into the fashioned surface being machined and cutting out a triangular-section specimen of a preset length by the electrodes of the working unit which is mounted on a shaft of the drive for vertically feeding the working unit provided on the carriage and also enhance productivity of the apparatus.

The mechanism for imparting oscillatory motions to the working unit may be made in the form of an electric motor with a reduction gear which is coupled by means of a shaft and a pusher to an arm connected to the shaft of the drive for vertically feeding the working unit. The mechanism for imparting oscillatory motions to the working unit which is so constructed allows the electrodes to be moved deep into the surface being machined and withdrawn after cutting out a triangular-section specimen owing to the oscillatory motions of the electrodes so as to spend less time for producing triangular-section specimens in comparison with sampling without a mechanism for imparting oscillatory motions to the working unit.

The disc of each electrode is preferably shaped as a dish, a part of the disc moved deep into the fashioned surface being bent with respect to the plane of the disc at an angle $\gamma$ determined by the formula:

$$\gamma = \alpha - \operatorname{arctg}\left[\frac{\{R - \sqrt{r^2 - (r - \delta/\sin\alpha)^2} + (R - \delta)^2\} \cdot \operatorname{tg}\alpha}{\delta}\right],$$

wherein
- $\alpha$ is the angle of inclination of the disc with respect to the horizontal plane in which the fashioned surface is machined;
- $r$ is the distance from the axis of the disc to its working end face;
- $R$ is the radius of a circle described by the working end face of the disc during the oscillatory motions of the working unit;
- $\delta$ is the amount of preset movement of the disc deep into the fashioned surface, the electrodes being provided on the drive for rotating the electrodes in such a manner that their bent portions face towards each other. With such a construction, when the electrodes move along an intricate path, a minimum groove width is ensured, less time is spent for sampling, and the specimen is of a minimum size.

The electrodes may be made to ensure variation of intensity of action of their peripheral and end faces upon the fashioned surface. The possibility of varying intensity of action of the peripheral and end faces of the electrodes upon the fashioned surface makes it possible to reach the preset depth of sampling faster when disc-shaped electrodes are used owing to the flow of current during the electrode movement deep into the surface not only through the working end face of the electrodes, but also through the peripheral surfaces of the electrodes.

The apparatus according to the invention for the electrochemical machining of fashioned surfaces allows metal specimens to be produced which are triangular in section. The triangular-section speciment is optimum for sampling as it offers maximum amount of metal for the tests.

The apparatus according to the invention allows a specimen to be produced for further tests, the part being suitable for further use after the sampling.

The apparatus makes it possible to sample metal from any surface of machined parts. A specimen may range in thickness between tenths of millimeter and over tens of millimeters. A specimen may weigh between tenths of gram and tens of gram. There is no surface deformation of metal and part being machined, nor there is any change in their structure during sampling so that a specimen is an authentic analog of the surface layer of the metal of a part being machined in which layer any destruction of the part during operation originates.

The invention allows a several-fold reduction of time spent for sampling in comparison with time needed to obtain a replica, i.e. a copy of the structure of the surface metal layer. Therefore, the invention makes it possible to lower labour effort of sampling in comparison with the replica technique. The invention also enhances quality of diagnosis of a part being machined as the real material is used for investigations rather than a copy of the structure of the surface layer thereof. The invention allows the electrodes to be moved deep into the surface being machined owing to oscillatory motions of the electrodes about an axis running in parallel with the fashioned surface being machined thereby ensuring sampling of a triangular-section specimen and enhancing productivity of the apparatus for the electrochemical machining of fashioned surfaces.

BRIEF DESCRIPTION OF THE DRAWINGS

The invention will now be described in detail with reference to specific embodiments illustrated in the accompanying drawings, in which.

DETAILED DESCRIPTION OF THE INVENTION

Figure 1:
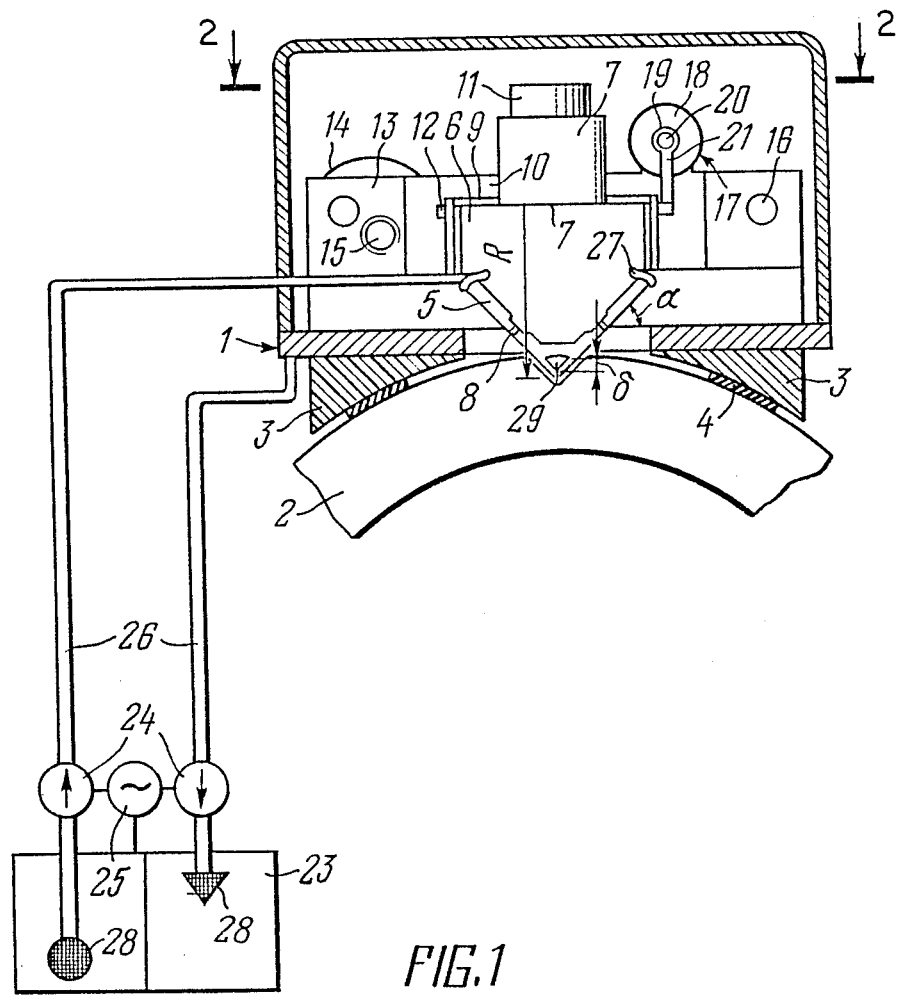
FIG. 1 is a general view of an apparatus for the electrochemical machining of fashioned surfaces in a partial longitudinal section showing a system for electrolyte supply, according to the invention.

An apparatus for the electrochemical machining of fashioned surfaces comprises a bed 1 (FIG. 1) which is held fast to a fashioned surface 2 by means of a removable bed 3 having seals 4. The apparatus also comprises a working unit coupled to the bed 1 and comprising a pair of electrodes 5 (FIGS. 1, 2) mounted on a drive for rotating the electrodes on the side of a fashioned surface 2 (FIG. 1). The drive for rotating the electrodes is in the form of a reduction gear 6 connected to an electric motor 7 and the electrodes 5. Each electrode 5 is in the form of a disc, the axes 8 of the discs extending at an angle with respect to each other. The apparatus comprises a system for feeding the working unit to the fashioned surface having a drive for vertically feeding the working unit which is in the form of a bracket 9 (FIGS. 1, 2) attached to a plate 10 and an electric motor 11 with a reduction gear. The working unit is mounted on a shaft 12 of the drive for vertically feeding the working unit. The system for feeding the working unit to the fashioned surface also comprises a carriage 12 having a drive for horizontally moving the carriage along the bed, the carriage being mounted on the bed 1. The drive for horizontally moving the carriage is in the form of an electric motor 14 with a reduction gear coupled to a motion screw 15. The carriage 13 is mounted on guide members 16 of the bed 1 for movement along the bed 1. The system for feeding the working unit to the fashioned surface also comprises a mechanism 17 for imparting oscillatory motions to the working unit which is provided on the carriage 13. The mechanism 17 for imparting oscillatory motions comprises an electric motor 18 with a reduction gear coupled by means of a shaft 19 and a pusher 20 to an arm 21. The arm 21 is connected to the shaft 12 of the drive for vertically feeding the working unit. The mechanism 17 for imparting oscillatory motions to the working unit may be in the form of an electric motor with a reduction gear connected by means of a pinion to a rack attached to the working unit (not shown in the drawings).

A sealing casing 22 is mounted on the bed 1 (FIG. 1). The system for electrolyte supply comprises a tank 23, a pair of pumps 24 connected to an electric motor 25 and hoses 26. One hose 26 is connected to nozzles 27 and is designed for supplying electrolyte and the other hose 26 is connected to a port in the bed 1 and is designed for removing electrolyte from the electrodes 5.

Filters 28 are provided at the ends of the hoses connected to the tank 23 for trapping suspended particles of dissolved metal. The axes 8 of the electrodes 5 are arranged to extend at an angle with respect to each other in such a manner that a specimen 29 of triangular section be cut out when the electrodes 5 are moved deep into the fashioned surface 2.

In FIG. 1:

$\alpha$ is the angle of inclination of the disc with respect to a horizontal plane in which the fashioned surface 2 is machined;

$\delta$ is the amount of movement of the disc deep into the fashioned surface 2; R is the radius of a circle described by the working end face of the disc during oscillations of the working unit.

Figure 2:
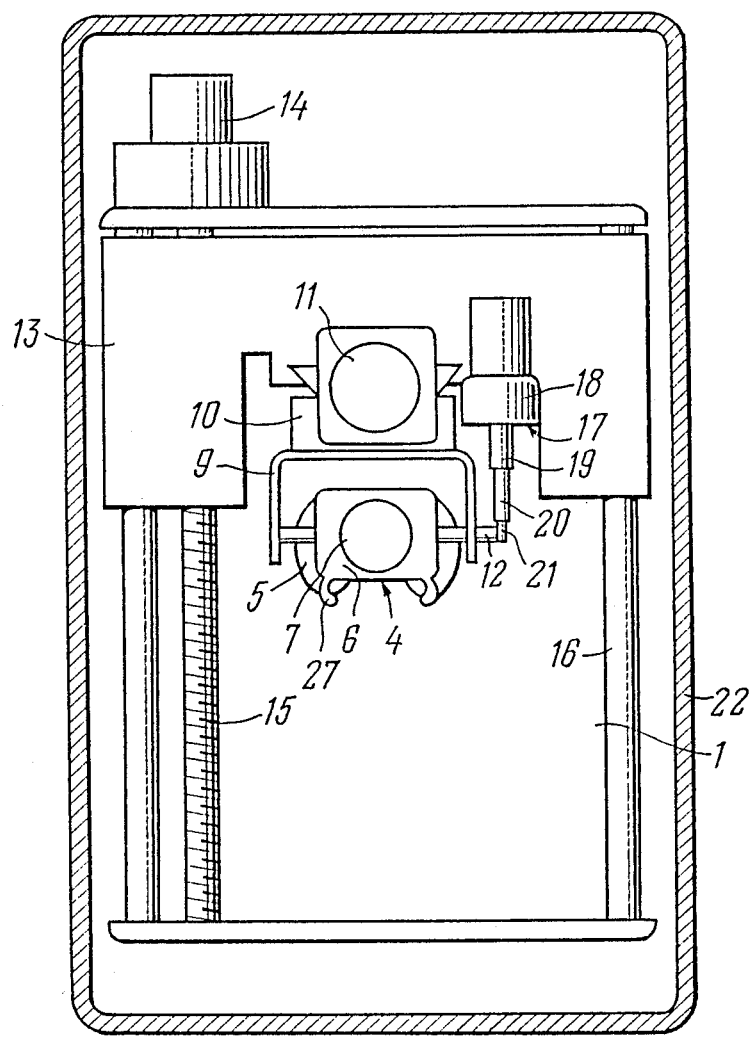
FIG. 2 is a sectional view of an apparatus for the electrochemical machining of fashioned surfaces taken along line II—II in FIG. 1.

The drive for vertically feeding the working unit is provided on the carriage 13 (FIG. 2). The axis about which oscillations of the electrodes 5 occur is aligned with the axis of the shaft 12. Electrodes 30 (FIG. 3) may be provided in such a manner that the disc of each electrode 30 is shaped as a dish. A part of the disc which is moved deep into the fashioned surface 2 (FIG. 4) is bent with respect to the plane of the disc at an angle $\gamma$ (FIG. 3) determined by the formula:

$$\gamma = \alpha - \mathrm{arctg}\left[\frac{\{R - \sqrt{r^2 - (r - \delta/\sin\alpha)^2} + (R - \delta)^2\} \cdot \mathrm{tg}\alpha}{\delta}\right], \quad (1)$$

wherein $\alpha$ (FIG. 1) is the angle of inclination of the disc with respect to a horizontal plane in which the fashioned surface 2 is machined;

$r$ (FIG. 3) is the distance from the axis 8 of the disc to the working end face;

R (FIG. 1) is the radius of a circle described by the working end face of the disc during oscillations of the working unit;

$\delta$ is the amount of preset movement of the disc deep into the fashioned surface 2.

Figure 3:
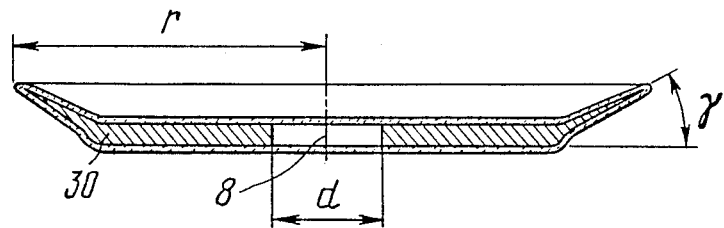
FIG. 3 shows a transverse sectional view of an electrode in the form of a dish-shaped disc.

In this particular case, $\alpha = 45°$; $r = 25$ mm; $R = 60$ mm; $\delta = 2$ mm, the angle $\gamma$ being equal to 21.8° (FIG. 3). The provision of the electrodes 30 having such a configuration is expedient in producing specimens 29 (FIG. 4) of minimum size.

In FIG 3: d is the diameter of a hole in the electrode 30.

Figure 4:
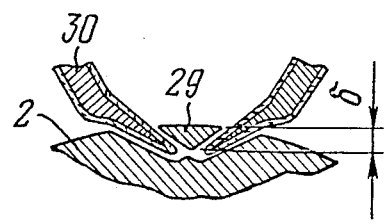
FIG. 4 is an enlarged transverse sectional view of a part of a fashioned surface showing electrodes moved deep therein, which are in the form of dish-shaped discs.

An optimum value of the angle $\gamma$ is within the range from 18° to 40°. With a value of the angle $\gamma$ smaller than 18° much metal is dissolved, the width of the cut increases, and time spent for producing the specimen 29 (FIG. 4) increases. With an angle $\gamma$ (FIG. 3) greater than 40°, the speed of rotation of the electrodes 30 substantially decreases because of an increase in friction forces in the groove being cut so as to result in an increase in time taken for producing the specimen 29 (FIG. 4). FIG. 4 shows an enlarged view of the fashioned surface 2 with the electrodes 30 in the form of dish-shaped discs moved deep into the surface. The specimen 29 is triangular in section. With the maximum depth of penetration, the electrodes 30 enter the fashioned surface 2 to a depth $\delta$. The electrodes 30 are mounted in such a manner that their bent portions face towards each other so as to produce and separate the triangular-section specimen 29.

The apparatus for the electrochemical machining of fashioned surfaces functions in the following manner. A removable bed 3 (FIG. 1) is chosen to have a curvature corresponding to the curvature of the fashioned surface 2. The bed 1 is then held fast by means of the removable bed 3 to the fashioned surface 2. The electrochemical machining of the fashioned surface 2 is carried out to produce the non-deformed specimen 29. Before starting the machining, a programming device (not shown) is used to set up dimensions of the specimen 29 to be produced. The programming device may be in the form of known per se control computers. For setting up dimensions of the specimen 29 to be produced, the cutting edges of the electrodes 5 are applied to the fashioned surface 2 being machined, and the electrodes 5 are then moved to the limit right-hand position. Voltage is applied to the electric motor 11 from a power supply unit of the apparatus (not shown), the bracket 9 coupled by means of the plate 10 to the reduction gear of the electric motor 11 is lowered to the fashioned surface 2, and the shaft 12 of the drive for vertically feeding the working unit on which the working unit is mounted is also moved down. The electrodes 5 are positioned in such a manner that they move deep into the fashioned surface by the amount $\delta$. The electric motor 11 is turned off. Electrolyte is then supplied from the tank 23 through the hose 26 and nozzles 27 to the electrodes 5. Voltage is then applied to the electric motor 7 from the power supply unit, and the reduction gear 6 imparts rotation to the electrodes 5. Voltage is also fed to the electric motor 18 so that the shaft 19 starts rotating to pull the pusher 20 which moves the arm 21 connected to the shaft 12. The shaft 12 starts rotating to rotate the working unit with the electrodes 5 mounted thereon. Oscillatory motions are imparted to the electrodes 5, and the electrodes 5 start acting upon the fashioned surface 2 and move deep into the fashioned surface 2 to a depth $\delta$, and the working unit is positioned in a plane extending at right angles to the fashioned surface 2. The electric motor 18 is then turned off. Voltage is then fed to the electric motor 14, the motion screw 15 starts rotating to move the carriage 13. The carriage 13 causes the working unit to move through a preset distance so that the electrodes 5 cut out the specimen 29 of a preset size of a constant cross-section. The electric motor 14 is then turned off (FIGS. 1, 2).

The specimen 29 (FIG. 1) is then engaged by using a magnet (not shown) or by an other appropriate known means (cf. E. V. Myslovsky. "Industrial Robots in the Manufacture of Radioelectronic Equipment" 1988. Radio i Svyaz Publishing House. Moscow. pp. 115-119). Voltage is then fed to the electric motor 18, the shaft 19 starts rotating to pull the pusher 20 which causes the arm 21 connected to the shaft 12 to move. The shaft 12 starts rotating to rotate the working unit with the electrodes 5 until the electrodes 5 are withdrawn from the fashioned surface 2 being machined. Electrolyte supply to the electrodes 5 is interrupted. The apparatus is then removed from the fashioned surface 2, and the specimen 29 is fed for further investigations. Penetration of the electrodes 5 to a preset depth δ and their withdrawal from the fashioned surface 2 owing to their oscillations allow the specimen 29 of triangular configuration to be obtained and productivity of cutting to be enhanced. For producing a triangular-section specimen 29 of minimum size, it is preferred that the electrodes 30 (FIG. 3) be in the form of dish-like discs. The specimen 29 may be cut out (FIG. 4) also without the horizontal movement of the carriage 13 (FIG. 1). Operation of the apparatus for the electrochemical machining of fashioned surfaces using the electrodes 30 (FIG. 3) is similar to that of the apparatus described with reference to FIG. 1 when the electrodes 5 were used in the form of discs. During movement of the electrodes 30 minimum width of cut is ensured and less time is spent for producing the specimen 29 (FIG. 4), the resultant specimen 29 being of minimum size and triangular in section. The apparatus having the electrodes 30 (FIG. 3) has a higher productivity.

If the electrodes 5 (FIG. 1) are made for varying intensity of action of the peripheral and end faces thereof upon the fashioned surface 2, productivity is also enhanced. To reduce time spent for moving the electrodes 5 deep into the surface by the amount δ, voltage is also fed to the electric motor 11, and the electrodes 5 are moved deeper owing to their oscillations and movement in a plane drawn perpendicularly with respect to the surface 2 being machined.

Therefore, the invention allows the electrodes 5 (FIG. 1) and 30 (FIG. 3) to be moved deeper and make it possible to produce the triangular-section specimen 29 (FIGS. 1, 4) and enhance productivity owing to the oscillatory motions of the electrodes 5, 30 (FIG. 3) about an axis running in parallel with the fashioned surface 2 being machined.

We claim:

1. An apparatus for the electrochemical machining of fashioned surfaces, comprising:
    a bed held fast to said fashioned surface;
    a working unit coupled to said bed;
    a pair of electrodes of said working unit; each of said electrodes of said working unit being in the form of a disc; the axes of said electrodes extending at an angle with respect to each other; a part of each of said electrodes moved deep into said fashioned surface; a working end face of each of said electrodes;
    a drive for rotating said electrodes of said working unit;
    said electrodes being mounted on said drive for rotating said electrodes on the side of said fashioned surface;
    a system for feeding said working unit to said fashioned surface;
    a carriage of said system for feeding said working unit to said fashioned surface mounted on said bed;
    a drive for horizontally moving said carriage along said bed connected to said carriage and mounted on said bed;
    a drive for vertically feeding said working unit in said system for feeding said working unit to said fashioned surface, said drive being mounted on said carriage and connected to said drive for rotating the electrodes; and two shafts of said drive for vertically feeding said working unit;
    said working unit being mounted on said two shafts of said drive for vertically feeding said working unit;
    a mechanism for imparting oscillatory motions to said working unit of said system for feeding said working unit to said fashioned surface, said mechanism being provided on said carriage.

2. An apparatus for the electrochemical machining of fashioned surfaces according to claim 1, comprising:
    an electric motor with a reduction gear of said mechanism for imparting oscillatory motions to said working unit; a shaft of said electric motor with the reduction gear;
    a pusher of said mechanism for imparting oscillatory motions to said working unit connected to said shaft of said electric motor with the reduction gear;
    an arm of said mechanism for imparting oscillatory motions to said working unit having one end connected to one of said shafts of said vertical feed drive and having the other end connected to said pusher.

3. An apparatus for the electrochemical machining of fashioned surfaces according to claim 1, wherein:
    said disc of each of said electrodes is shaped as a dish;
    said part of each of said electrodes which is moved deep into said fashioned surface being bent with respect to the plane of said disc at an angle γ determined from the formula $$\gamma = \alpha - \mathrm{arctg}\left[\frac{\{R - \sqrt{r^2 - (r - \delta/\sin\alpha)^2} + (R - \delta)^2\} \cdot \mathrm{tg}\alpha}{\delta}\right],$$

wherein
α is the angle of inclination of said disc with respect to a horizontal plane in which said fashioned surface is machined;
r is the distance from said axis of said electrodes to said working end face thereof;
R is the radius of a circle described by said working end face of said electrode during oscillatory motions of said working unit;
δ is the amount of preset movement of said electrode deep into said fashioned surface;
said electrodes being mounted on said drive for rotating said electrodes in such a manner that said parts thereof bent with respect to the plane of said disc face towards each other.

4. An apparatus for the electrochemical machining of fashioned surfaces according to claim 1, wherein:
    said electrodes are made in such a manner as to vary intensity of action of their peripheral and end faces upon said fashioned surface.

* * * * *